United States Patent [19]

DeGuia

[11] Patent Number: 5,132,397
[45] Date of Patent: Jul. 21, 1992

[54] 4-VALEROLACTONE COPOLYMERS

[75] Inventor: Andrea A. DeGuia, Clinton, Mass.

[73] Assignee: Polysar Financial Services S.A., Fribourg, Switzerland

[21] Appl. No.: 679,231

[22] Filed: Apr. 2, 1991

[51] Int. Cl.5 .............................................. C08G 63/08
[52] U.S. Cl. .................................. 528/354; 528/357; 525/415
[58] Field of Search ........................ 528/354, 357, 415

[56] References Cited

U.S. PATENT DOCUMENTS 4,045,418  8/1977  Sinclair ............................... 528/357
4,643,734  2/1987  Lin ...................................... 528/354

FOREIGN PATENT DOCUMENTS

WO90/01521  2/1990  PCT Int'l Appl. .

Primary Examiner—John Kight, III
Assistant Examiner—Shelley A. Wright
Attorney, Agent, or Firm—Stevens, Davis, Miller & Mosher

[57] ABSTRACT

Copolymers of lactic acid, from 0.5 to 20 weight % of 4-valerolactone and from 0 to 20 weight % of a $C_{6-8}$ lactone form polymers having a higher intrinsic viscosity than homopolymers of lactic acid per se. The polymers also have an increased heat stability over the homopolymer of lactic acid.

10 Claims, No Drawings

4-VALEROLACTONE COPOLYMERS

FIELD OF THE INVENTION

The present invention relates to lactic acid co- and ter polymers. More specifically the present invention relates to lactic acid polymers which contain 4-valerolactone.

BACKGROUND OF THE INVENTION

There is an increasing concern with the environmental impact of waste. More particularly there is a concern with the use of non-degradable material such as petroleum based plastics. There has been for some time knowledge of degradable polymers based on lactides. Generally these polymers have been produced either by a fermentation process or by the direct polymerization of lactic acid. Such polymers have had very little impact on the field of plastics due to cost and monomer supply considerations. There is now a renewed interest in such polymers. However, when lactic acid is polymerized there is a tendency for it to form dimers or lactides. This tends to reduce yield, slow the rate of reaction and result in polylactides having a low molecular weight or a low intrinsic viscosity in the neighbourhood of less than 0.1 dl/g as measured as a 0.5% solution of polymer in a solvent such as chloroform.

WO 90/01521 published Feb. 22, 1990 in the name of Battelle Memorial Institute contains a good review of the history of such polymers and a good outline of the prior art.

U.S. Pat. No. 4,045,418 issued Aug. 30, 1977 assigned to Gulf Oil Corporation discloses the copolymerization of lactic acid and caprolactone. Additionally the patent discloses the polymerization of lactic acid with 4-valerolactone and delta valerolactone. The disclosure of the patent concludes that the only copolymerizable monomer in addition to caprolactone is delta - valerolactone (Col. 3, lines 60 through 69). The 4-valerolactone did not polymerize at all. As such the teaching of U.S. patent goes against the subject matter of the present invention.

The present invention seeks to provide a co- or ter polymer of lactic acid which contains 4-valerolactone.

SUMMARY OF THE INVENTION

The present invention provides a polymer having an intrinsic viscosity (I.V.) of not less than 0.4 as measured as a 0.5% solution of polymer in chloroform comprising:
i) from 99.5 to 60 weight % of one or more monomers selected from the group consisting of D, L, lactic acid, and mixtures thereof;
ii) from 0.5 to 20 weight % of 4-valerolactone; and
iii) from 0 to 20 weight % of one or more $C_{6-8}$ lactones.

The present invention also provides a process for preparing the above polymer comprising heating a melt of a monomer composition as above to a temperature from 180° to 200° C. for a time of at least about 4 hours in the presence of a catalyst.

DETAILED DESCRIPTION

The polymers of the present invention comprise from 99.5 to 60 preferably from 99 to 80 weight % of one or more monomers selected from the group consisting of D, L, lactic acid and lactides thereof and mixtures thereof.

Since lactic acid has an asymmetric carbon atom it will form isomers. Thus the monomer could be in the D, or the L form or a mixture thereof.

The polymers of the present invention also comprise from 0.5 to 20, preferably from 0.5 to 10, most preferably from 1 to 10 weight % of 4-valerolactone or gamma valerolactone or the lactone of 4 hydroxy valeric acid. This monomer has the formula:

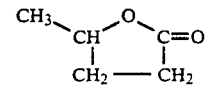

The polymers of the present invention may be a copolymer of lactic acid and 4-valerolactone.

The polymers of the present invention may be terpolymers which contain a third monomer. The third monomer if present may be a one or monomers selected from the group consisting of $C_{6-8}$ lactones.

If a $C_{6-8}$ lactone is used as a third monomer it will be present in an amount not greater than 20, preferably from 1 to 10 weight % of the polymer.

Epsilon caprolactone is a suitable $C_{6-8}$ caprolactone.

The polymers of the present invention may be prepared using conventional techniques to polymerize lactic acid. The liquid monomer mixture is heated to 180° C. and a catalyst added when most (about 90%) of the water of condensation has been removed. Typically the catalyst will be a metal complex such as a tin or aluminum complex or an acidic ion exchange resin. A particularly useful catalyst is stannous octoate. The process may be carried out in batch form or continuously. Continuous polymerization of lactic acid is more fully described in the copending patent application filed in the names of G. Kharas, S. P. Nemphos and I. Fridman Feb. 22, 1991 assigned to Polysar Financial Services S.A. The polymerization should be driven to over 95% conversion generally to over 98% conversion. For a lab scale batch reaction in glass ware this will take in the order from about 24 to 48 hours at the above-noted temperatures. On an industrial scale the time the melt is exposed to polymerization conditions will depend on the process and the reactor size. Generally it should not be less than about 12 hours residence time in the reactor.

After polymerization on a lab scale the polymer may then be dissolved in or at least thinned with a solvent such as methylene chloride then reprecipitated from methanol. On an industrial scale the polymer melt is usually pumped from the reactor as a melt.

The polymers of the present invention have a better polymerization rate than when polymerizing directly from lactic acid. Particularly, without being bound by theory, it is believed that the lactic acid reaction proceeds with formation of significant amounts of lactide. In the presence of lactones, the formation of lactide is believed to be minimized, leading to higher I.V. at shorter time. The polymers of the present invention have an intrinsic viscosity of at least 0.4 as measured as a 0.5% solution of polymer in chloroform. Additionally the resulting polymers appear to have somewhat better thermal stability than the homopolymers.

The present invention will now be illustrated by the following examples in which unless otherwise indicated parts is parts by weight (e.g. g) and % is weight %.

EXAMPLE 1

Into a 300 ml four necked flask were weighed 180 g of distilled lactic acid and 20 g of 4-valerolactone. The flask was flushed with nitrogen and heated to 180° C. When the temperature reached 180° C, 0.1 g of stannous octoate was added to the reaction mixture. The reaction mixture was then heated to 200° C. and held at this temperature overnight. Nitrogen was blown into the polymer melt to remove water of condensation. As the reaction continued the temperature rose slightly to not more than 204° C. After about 44 hours the reaction was stopped.

The reactor contents were analyzed for lactide formation. The total lactide formation was 3.5 g which was less than 1.75%. The resulting polymer had an intrinsic viscosity of 0.45 dl/g which indicates a molecular weight of not less than about 30,000. The copolymer had a 10% weight loss at a degradation temperature of 313° C. which is greater than the 10% weight loss degradation temperature of 272° C. for the homopolymer of lactic acid.

EXAMPLE 2

(Comparative example)

To a 300 ml, 4 necked glass flask were added 180 g of distilled lactic acid. The lactic acid was heated to 180° C. and a stream of nitrogen was blown into the melt to remove water of condensation. This was carried out for 6 hours. Then 0.08 g of stannous octoate (as a solution) was added drop wise to the reaction melt (4 drops). The melt was maintained at a temperature from 180 to 202° C. for a further 26 hours. The reaction product was then removed from the glass ware.

Three samples were taken at 4 hours, 18 hours and 26 hours. There was some difficulty with plugging of the arm of the vessel with lactide in the process of removing water of condensation. In the first sample, the conversion was 77% and the other two samples, the conversion was 100%. The intrinsic viscosity of the polymer at 77% conversion was 0.09 g/dl while that of the other two samples which went to 100% conversion were 0.26 g/dl and 0.32 g/dl.

What is claimed is:

1. A polymer having an intrinsic viscosity of not less than 0.4 as measured as a 0.5% solution of polymer in chloroform comprising:
    i) from 99.5 to 60 weight % of one or more monomers selected from the group consisting of D, L, lactic acid, and mixtures thereof;
    ii) from 0.5 to 20 weight % of 4-valerolactone; and
    iii) from 0 to 20 weight % of one or more $C_{6-8}$ lactones.

2. The polymer according to claim 1, wherein said valerolactone is present in an amount from 1 to 10 weight %.

3. The polymer according to claim 2 wherein said $C_{6-8}$ lactone is present in an amount from 1 to 10 weight %.

4. The polymer according to claim 3, wherein said $C_{6-8}$ lactone is a caprolactone.

5. The polymer according to claim 4, wherein said caprolactone is epsilon caprolactone.

6. A process for polymerizing a polymer having an intrinsic viscosity of not less than 0.4 as measured as a 0.5% solution of polymer in chloroform comprising:
    (i) from 99.5 to 60 weight % of one or more monomers selected from the group consisting of D, L, lactic acid, and a mixture thereof;
    (ii) from 0.5 to 20 weight % of 4-Valerolactone; and
    (iii) from 0 to 20 weight % of one or more $C_{6-8}$ lactones;
which comprises heating a melt of the above monomer composition at a temperature from 180° to 200° C. for a time of at least about 12 hours in the presence of a catalyst.

7. The process according to claim 6, wherein said catalyst is selected from the group consisting of a tin or aluminum complex and an acidic ion exchange resin.

8. The process according to claim 7, wherein said catalyst is stannous octoate.

9. The process according to claim 8, wherein the conversion is greater than 98%.

10. The process according to claim 9, which is continuous.

* * * * *